April 16, 1968   C. K. MOUSEL   3,378,154

WHEEL JACK AND CARRIER

Filed Feb. 25, 1966

INVENTOR.
C. K. MOUSEL

BY

Victor J. Evans & Co
ATTORNEYS 3,378,154
WHEEL JACK AND CARRIER
Canellen K. Mousel, Edison, Nebr. 68936
Filed Feb. 25, 1966, Ser. No. 530,100
1 Claim. (Cl. 214—332)

ABSTRACT OF THE DISCLOSURE

An improved wheel jack and carrier having a wide angled frame of parallel bars adapted to carry a tire, transverse support members, roller elements mounted on the peripheral transverse support members, and extensions having a stabilizer plate mounted thereunder and having a snap-fit recess coupling member and a further extension removably connected as a handle to couple with the recess coupling member.

---

The present invention relates to a new and improved wheel jack and carrier for moving about large tires and wheels which are to be mounted and removed from vehicles and alike, and more particularly the invention is directed to a wide-angled frame of parallel bars having rollers at the ends of the frame and extensions transversely disposed at an intermediate point on each side of the frame for providing rolling contact with a floor, as well as for mounting a handle and stabilizing plate means as well.

By means of the present invention a person may jack up his car, take off the wheel from the vehicle by means of the present invention, load the spare tire on the carrier of the present invention and wheel the spare tire into place on the vehicle by the handle and achieving stabilization by allowing the stabilization plate to slide along in surface contact with the floor surface. Also one's hand is used to steady the wheel while the other hand is applied to the carrier jack handle.

A further object of the present invention is to perform tire changing functions in a stand up position with ease and obviate any necessity of getting down on one's knees while mounting a tire on a vehicle.

A further object of the present invention is to provide a wide angle V-shaped cradle constructed to carry a tire so as to prevent distortion of the tire position while being transported, removed or replaced from a vehicle wheel.

A further object of the invention is to provide a supporting device having engaging rollers at the ends of the wide angle V-shaped cradle and in such construction so that the side members upon which the journals of the tire engaging rollers are made of angle iron.

A further object of the invention is to provide a tire carrier enclosure to prevent distortion of the tire wheel being transported to or from a vehicle without requiring any particular effort on the part of the one changing the tire to maintain an upright position of the one changing the tire.

A further object of the invention is to provide a stabilizing plate means so that the wheel jack carrier is prevented from tilting sideways.

The above and other objects and advantages of the invention will become apparent upon full consideration of the following detailed description and accompanying drawings in which.

Figure 1:
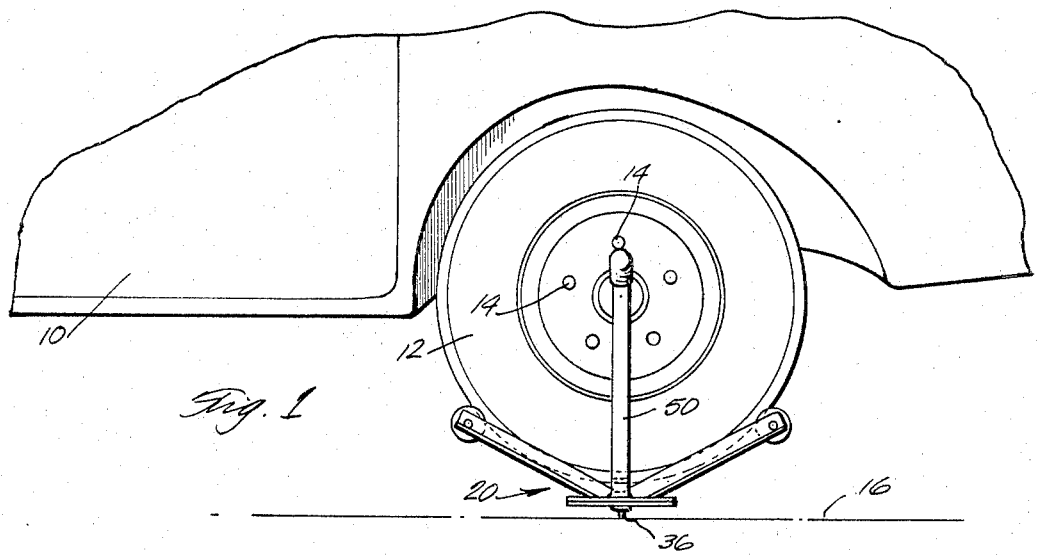
FIGURE 1 shows a broken away side elevation view of a wheel mounted on a vehicle in which the wheel carrier jack of the present invention is applied to a tire for lifting the tire to and from the vehicle.
Figure 2:
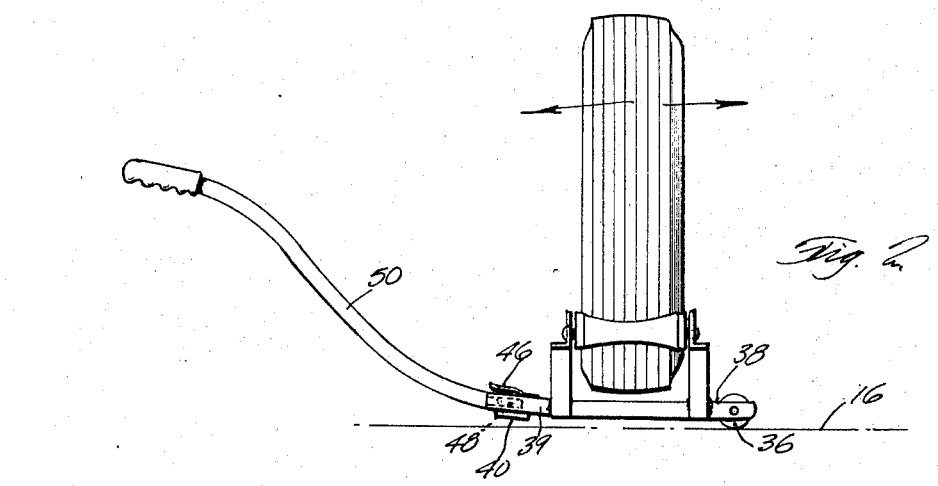
FIGURE 2 shows a side view of the wheel jack carrier of FIGURE 1 without showing the vehicle.

Referring now to the drawings, there is shown a vehicle (in part) 10, to which is mounted a wheel including a tire 12 mounted on the vehicle by conventional bolts 14, 14. The vehicle is raised from the ground surface 16 by conventional jack (not shown) in the conventional manner. While the tire 12 is in its raised position as shown in FIGURE 1, the wheel carrier 20 is inserted under the tire 12 as shown. The tire carrier includes a wide angled frame of generally parallel bars 24, 26, 24, 26 to comprise a V-shaped cradle when including transverse support member 30 which is centrally disposed of the parallel bars, and peripherally disposed support members 32, 34, on which may be included or mounted rollers as shown. The over-all length of the cradle or carrier 20 is in the same order of magnitude as the diameter of the tire which is carried by the cradle.

There are extensions on the central transverse support member 30, one extension having a roller 36 for engaging a floor surface, the wheel 36 being mounted generally at the distal end of the extension 38. The other extension 39 of member 30 has a stabilizing plate 40 mounted on the underside thereof. This stabilizing plate is in substantially continual surface contact with the floor surface 16 as it is moved about and as roller 36 rolls along the floor surface.

Figure 3:
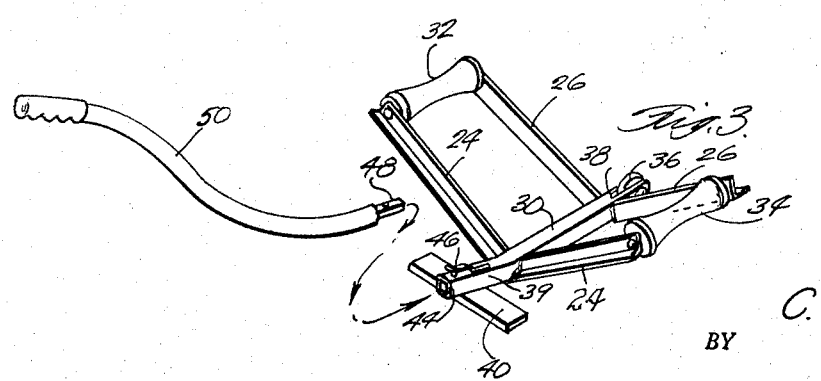
FIGURE 3 shows a perspective view of the wheel jack carrier, stabilizing means, and in which the handle is removed therefrom, in accordance with the concepts of the embodiments of the present invention.

At the end of the extension 39 is a recessed coupling member 44 including a spring biased fastener 46 to securely engage a mating end 48 of a carrier or cradle handle 50, as is illustrated in FIGURE 3.

The radius of curvature of the tire 12 is such that the tire is generaly tangential to all transverse support members 30, 32, 34.

When moving the carrier about in the direction of rotation of the wheel 36, the stabilizing plate 40 is in generally frictional contact or is otherwise in proximate contact with the floor surface 16. The tire 12 may as well be generally held in place by one hand of the operator while the other hand is on the handle 50. In this way the tire 12 may be easily applied and removed from the vehicle 10, and sufficient leverage is able to be applied to the tire 12 by raising and lowering the handle 50 so that the tire engages the supporting bolts 14, 14.

Additional embodiments of the invention in this specification will occur to others and therefore it is intended that the scope of the invention be limited only by the appended claim and not by the embodiment described hereinabove. Accordingly, reference should be made to the following claim in determining the full scope of the invention.

What is claimed is:

1. An improved wheel jack and wheel carrier comprising a wide angled frame of parallel bars of an over-all length in the same order of magnitude as the diameter of the tire to be carried, transverse support members centrally and peripherally disposed of the length of the parallel bars, concave roller elements mounted on the peripheral transverse support members for engaging the circumferential surface of a wheel, perpendicular extensions on each side of the parallel bars of the central transverse support member, one extension having a roller at the distal end to engage a floor surface, the other extension having a subtending, perpendicularly disposed stabilizer plate mounted thereunder and having a snap-fit recessed coupling member, and a removably connected extension handle to couple with the recessed coupling member, a spring biased fastener maintaining the handle secured to the recessed coupling member, the radius of curvature of the tire being substantially tangential to the transverse support members of the parallel bars.

References Cited

UNITED STATES PATENTS

| | | | |
|---|---|---|---|
| 2,345,458 | 3/1944 | Caron | 214—332 |
| 2,570,587 | 10/1951 | Noone et al. | 214—332 |
| 2,613,084 | 10/1952 | Burch | 214—330 |
| 2,815,877 | 12/1957 | Marshall | 214—332 |
| 3,084,819 | 4/1963 | Tropiano | 214—334 |

HUGO O. SCHULZ, *Primary Examiner.*